US005222921A

United States Patent [19]
Garcia

[11] Patent Number: 5,222,921
[45] Date of Patent: Jun. 29, 1993

[54] CONTINUOUS GEAR CHANGE MECHANISM

[75] Inventor: Julian P. Garcia, Madrid, Spain

[73] Assignee: Aragonesa De Equipamientos Para Automoviles, Zaragoza, Spain

[21] Appl. No.: 717,797

[22] Filed: Jun. 19, 1991

[30] Foreign Application Priority Data

Jun. 20, 1990 [ES]  Spain .................................. 9001713

[51] Int. Cl.⁵ ............................................. F16H 47/04
[52] U.S. Cl. ...................................... 475/72; 475/80
[58] Field of Search ...................... 475/72, 73, 74, 75, 475/76, 77, 78, 79, 80, 81, 82

[56] References Cited

U.S. PATENT DOCUMENTS

| | | | |
|---|---|---|---|
| 2,939,342 | 6/1960 | Woydt et al. | 475/78 |
| 3,300,000 | 1/1967 | Stoyke | 475/76 X |
| 3,534,631 | 10/1970 | Keller | 475/72 X |
| 3,665,788 | 5/1972 | Nyman | 475/72 |
| 4,341,132 | 7/1982 | Burdick | 475/72 |
| 4,563,914 | 6/1986 | Miller | 475/80 |
| 4,776,233 | 10/1988 | Kita et al. | 475/76 |
| 4,976,664 | 12/1990 | Hagin et al. | 475/76 X |
| 4,976,666 | 12/1990 | Meyerle | 475/76 X |
| 4,983,149 | 1/1991 | Kita | 475/78 X |
| 5,011,463 | 4/1991 | Jarchow et al. | 475/78 X |

FOREIGN PATENT DOCUMENTS

| | | |
|---|---|---|
| 0003397 | 8/1979 | European Pat. Off. . |
| 0059055 | 9/1982 | European Pat. Off. . |
| 0143365 | 6/1985 | European Pat. Off. . |
| 0151946 | 8/1985 | European Pat. Off. . |
| 195452 | 9/1986 | European Pat. Off. . |
| 1500489 | 6/1969 | Fed. Rep. of Germany ........ 475/72 |
| 2141098 | 8/1971 | Fed. Rep. of Germany . |
| 2757191 | 7/1979 | Fed. Rep. of Germany ........ 475/72 |
| 2854375 | 6/1980 | Fed. Rep. of Germany . |
| 2373000 | 6/1978 | France . |
| 2387388 | 11/1978 | France . |
| 2412760 | 7/1979 | France . |
| 62-98051 | 5/1987 | Japan ................................... 475/72 |
| 62-113960 | 5/1987 | Japan ................................... 475/72 |
| 569775 | 9/1977 | U.S.S.R. ............................. 475/75 |
| 1097848 | 6/1984 | U.S.S.R. ............................. 475/72 |
| 362999 | 12/1931 | United Kingdom . |
| 2049843 | 12/1986 | United Kingdom . |

Primary Examiner—Richard M. Lorence
Assistant Examiner—Khoi Q. Ta
Attorney, Agent, or Firm—Morgan & Finnegan

[57] ABSTRACT

A continuous gear change mechanism which includes an input shaft, an output shaft, interlocking cogged wheels, a hydrostatic transmission and a epicycloidal gear.

The hydrostatic transmission includes both a hydraulic pump and a motor being at least one of these components of the hydrostatic transmission in gear with one of the epicycloidal gear components.

Two other components of this epicycloidal gear interlock with separate and independent portions of the input shaft.

At least, in addition, the pump is of variable-flow type and is reversible in its operation.

11 Claims, 10 Drawing Sheets

CONTINUOUS GEAR CHANGE MECHANISM

BACKGROUND OF THE INVENTION

This invention refers to a continuous gear change mechanism for thermal engine vehicles which can easily be adapted to suit farm vehicles, trucks, cars, etc.

The gear change mechanism detailed in this invention comprises separate input and output shafts onto which interlocking pinions and cogged wheels are mounted for interaction.

At present, gear change mechanisms used in all vehicles (industrial, trucks, cars, etc) are of the discontinuous type, i.e. they are restricted to use only under determined fixed transmision ratios, these are popularly known as "gears" in such a way that the vehicle speed in each one of them is proportional to the turning rate of the engine (r.p.m.) so when the speed needs to be increased once the engine runs at maximum turning rate allowed the only possible way is to select the next higher gear.

Gearboxes in use today are of two basic types: constant mesh and planetary gear.

The first type is more commonly used and consists basically of three main shafts (input, intermediate and output), with a pair of cogged wheels in gear with each other (constant mesh) locking the input and intermediate shafts and several couples of cogged wheels, as many as the number of gears, connecting the intermediate and output shafts.

Gear change mechanisms with planetary or epicycloidal gears are best suited to automatic gear boxes, whereby the gear changing operation is carried out automatically, i.e. without any action on the part of the driver; at any rate, these mechanisms turn out to be still discontinuous in power release.

Power transmission is completely mechanical in both cases, i.e. via interlocking cogged wheels with the appropriate interlocking device.

The Dutch manufacturer of D.A.F. vehicles has used a continuous gear change mechanism in medium size vehicles (car mod. DAF-44). This consisted of a special transmission belt between two pulleys which could vary their respective radii. This was achieved by the approach or the separation of the two tronconical plates that formed each pulley.

Attempts have been made to improve this type of device, but up to date a commercially feasible mechanism has not been yet manufactured, which is the main goal of this invention.

Continuous gear change mechanisms offer a clear improvement over discontinuous ones since they provide a better acceleration capacity, lower fuel consumption, lower pollution levels, longer useful life of the engine, etc.

SUMMARY OF THE INVENTION

The aim of this invention is to produce a continuous gear change mechanism comprisisng a connection between a variable-flow hydrostatic transmission and a conventional mechanical gear transmission (conventional gearbox) in such a way that the maximum amount of power passing through the the hydrostatic transmission is always a small amount of the total power produced by the engine of the vehicle.

The gear change mechanism described in this invention is distinguished by the fact that it includes continuous and power providing module comprising a hydrostatic transmission and a epicycloidal gear, attached to a conventional mesh of gears. The hydrostatic transmission includes a hydraulic motor and a pump offering variable flow, reversible flow, and a null flow position.

The mentioned pump and hydraulic motor tie-in with two of the components of the epicycloidal gear, one of these components and the third component of the epicycloidal gear being linked to separate coaxial stretches of the input shaft.

The gear change mechanisms described in this invention provide numerous improvements compared to traditional mechanisms. For example:

a) It has a variety of hydrostatic and power providing modules, which share the same general scope, power shunt and working capacity characteristics.

b) Offers the possibility to incorporate a clutch facility to said modules, by means of the elimination of hydraulic pressure fron the hydrostatic circuit or by activating a by-pass valve or device. As described before this hydraulic motor will have a gear for null output speed.

c) Offers the possibility to stablish mechanical, hydraulic, electrical bonds or a mixture of these between the clutch pedal and the hydraulic pressure restriction valves and/or with the by-pass valve or device.

d) Offers the possibility to incorporate appropriate devices to ensure that vehicle speed changes will be achieved via the accelerator pedal, while the turning rate of the thermal engine remains constant for a specific speed range. This will be done by pressing on the accelerator pedal in order that it will increase or decrease of the flow lever of the hydraulic pump in the appropriate manner.

e) Offers the possibility to assemble the hydraulic motor and pump either separately or within the same module. In the latter case, the hydraulic circuits and related components will be streamlined to a great degree.

f) Offers the possibility for the hydraulic motor and the pump to be reversible, i.e. each one can absorb mechanical power and release it as hydraulic power, or vice versa.

The hydraulic motor should turn in both directions preferably within predetermined limits with respect to a number of revolutions per minute, which correspond to the same amount of hydraulic powe output provided. It is possible for the motor to turn in the same direction in the case of both maximum and minimum turning rates, however, if this is done the final otuput levels will not turn out to be the same. For the variable-flow hydraulic pump, the final flow will run in the opposite direction to that of the oil within its appropriate circuit, however, it is possible to use a hydraulic pump whereby the final flow corresponds in direction to that of the oil movement.

In accordance with one operational feature, the input shaft of the gear mechanism is divided into two separate aligned tracks, one of which (propelling) can be connected to the thermal engine, and the other being known as propelled. The propelling track is an integral part of the epycicloidal gear components and the propelled track is an integral part of another of its components.

The input shaft can also be made up from three separate coaxial tracks: an internal track which is an integral part of the crown gear of the epicycloidal gear and activates the hydrostatic transmission pump, an intermediate track which is part of the sun gear and is activated by the hydraulic motor, and an external track which is an integral partof the planetary member holder and has cogged wheels which interlock with the wheels and/or pinions of the output shaft.

According to the second operational feature, there can be attached a planetary gear to the end of the output shaft which is adjacent to the outlet. This output shaft can also have three intermediate planetary gears and one final output gear which provides for the reverse gear function. According to the third disposition mentioned an additional sliding sleeve can be included in order to avoid the very high turning speeds which would arise in the sun gears of the planetary gears during the gear selection process.

It is not neccesary for the planetary gears mounted on the output shaft to have crowns by taking the sun gear shaft of the many gears having a disk brake for speed range selection. There is a sleeve at the front of the output shaft by means of which reverse gear is provide for.

The main features of the invention are described below more detailed in the patent claims, making reference to the attached drawings which open a huge variety of operational possible developments.

BRIEF DESCRIPTION OF THE DRAWINGS

In the description of the various figures, the same reference numbers will be used to identify components or parts which appear on more than one ocassion.

DETAILED DESCRIPTION

Figure 1:
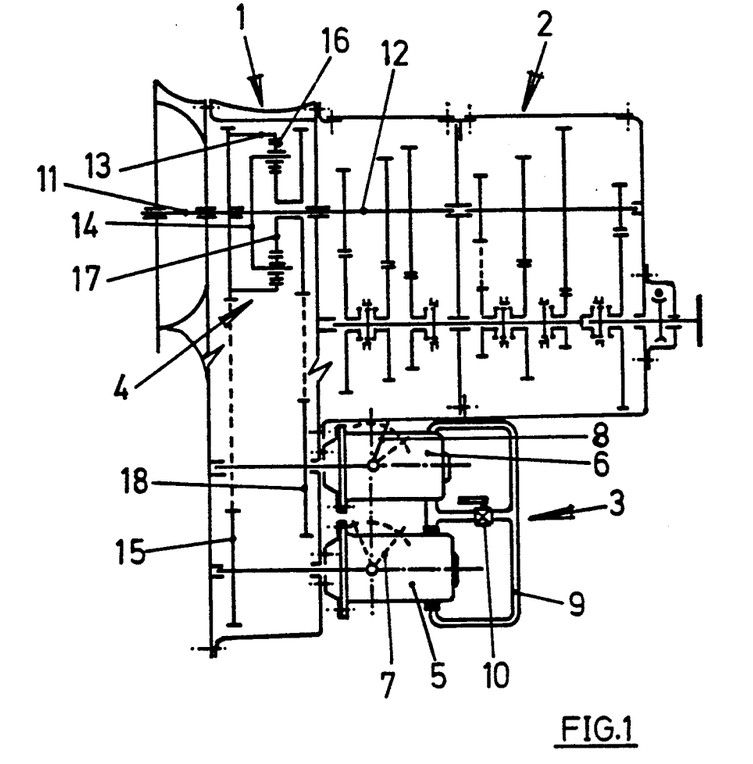
FIG. 1 is a chart diametric section of a gear change mechanism built in accordance with this invention, which includes a conventional 3×3 gear box.

FIG. 1 shows a device which has a continuity and power deriving module (1) and on a conventional 3×3 gear box (2).

The continuity and power deriving module comprises a hydrostatic transmission (3) and an epicycloidal gear (4). The hydrostatic transmission consists of a variable-flow hydraulic pump (5), preferably having axial pistons, and a hydraulic motor (6), also having axial pistons. Both the pump and the hydraulic motor are reversible, i.e. the pump can act as a pump or as a motor, and the motor can act as an hydraulic motor or as a pump.

The pump (5) has a flow variation lever (7) by means of which the direction in which the hydraulic motor turns can be regulated so that it is the same or opposite to that of the pump. Therefore, the lever (7) moves between the extreme positions (shown as a dotted line) passing through an intermediate position which corresponds to that of null flow (shown as a continuous line).

The hydraulic motor (6) also has a flow variation lever (8) which can take up any intermediate position between the two extreme points which correspond to maximum and minimum flow levels. Thus the motor is reversible, i.e. it also functions as an hydraulic pump.

The hydraulic circuit (9) between the pump (5) and the motor (6), has a bypass valve (10) and an appropriate number of pressure restriction valves (not shown) (in order to simplify the diagram, certain components have been omitted, e.g. oil tank, filters, heat interchanger).

In FIG. 1, the gear box input shaft is subdivided into two separated aligned tracks, one being propelling (11) which is connectable to the thermal engine shaft, and the other propelled (12). The propelling track is an integral part of the ring gear (13) of the epicycloidal gear. The propelled track is an integral part of the planetary member holder (14) of said gear. The ring gear (13) has two gears, one interlocking with a cogged wheel (15) which forms part of the pump shaft (5), and the other interlocking with the planetary members (16) of the epicycloidal gear. The sun gear (17) of this gear also has two cogged wheels, one interlocking with a wheel (18) which forms a part of the hydraulic motor (6) shaft, and the other interlocking with the planetary members (16).

The input shaft (11) activates the pump (5) through the crown gear (13), and the pump (5) activates the motor (6), which shaft is in gear with the sun gear (17) of the epicycloidal gear via the cogged wheel (18). The planetary member holder (14) plate start s to function, locked onto the portion (12) which corresponds to the set of gears of a conventional gear change mechanism (2).

To obtain each speed range which can be selected by means of the gear box (2), the lever (7) of the pump (5) moves between its extreme positions, allowing for variation of the flow and for turning of the engine at different speeds and in differen directions, given that the lever, when moving between the extreme positions, passes trough an intermediate point which corresponds to a null-flow point. By means of this engine flow variations lever (8), variations in the turning speed can be obtained.

Figure 2:
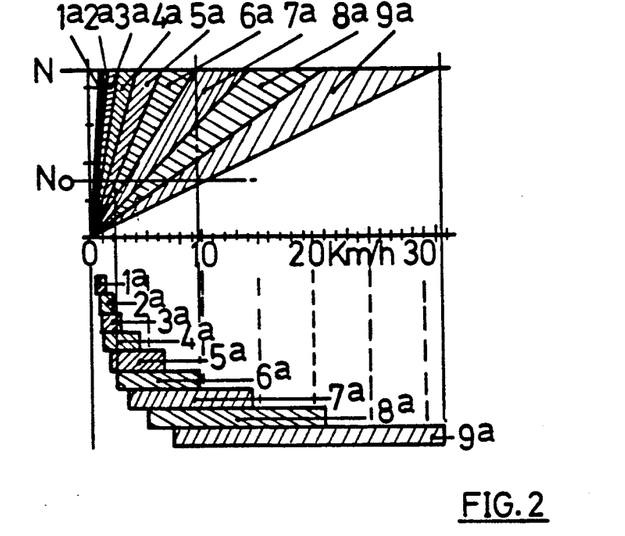
FIG. 2 shows the kinematics relating to the perfomance of a vehicle using the gear change box shown in FIG. 1.

The diagram shown in FIG. 2 indicates vehicle performance in the case of a gear box as shown in FIG. 1. Revolutions per minute of the thermal engine of the vehicle are shown in y-coordinates and the speed of the vehicle in kilometers per hour is shown in x-coordinates.

From this graph it can be observed that at each speed there is a continuous and total variation of transmission ratios, this being shown by the slope lines passing through the coordinates origin. N and N0 indicate the maximum (r.p.m.) and maximum torque levels of the thermal engine of the vehicle. The lower section of this graph shows the complete speed range of the vehicle for these selected gears.

As usual, the minimum value has been defined in accordance with the N0 rating in order to obtain a stable velocity.

In FIGS. 1 and 2 we can see the operational layout and kinematics of a continuous gear change mechanism, installed in a vehicle with very low speed requirements (farm tractor, public works machinery, etc.). In FIG. 1, the hydraulic transmission (3) is placed rotated for better graphic describing.

Figures 3, 4:
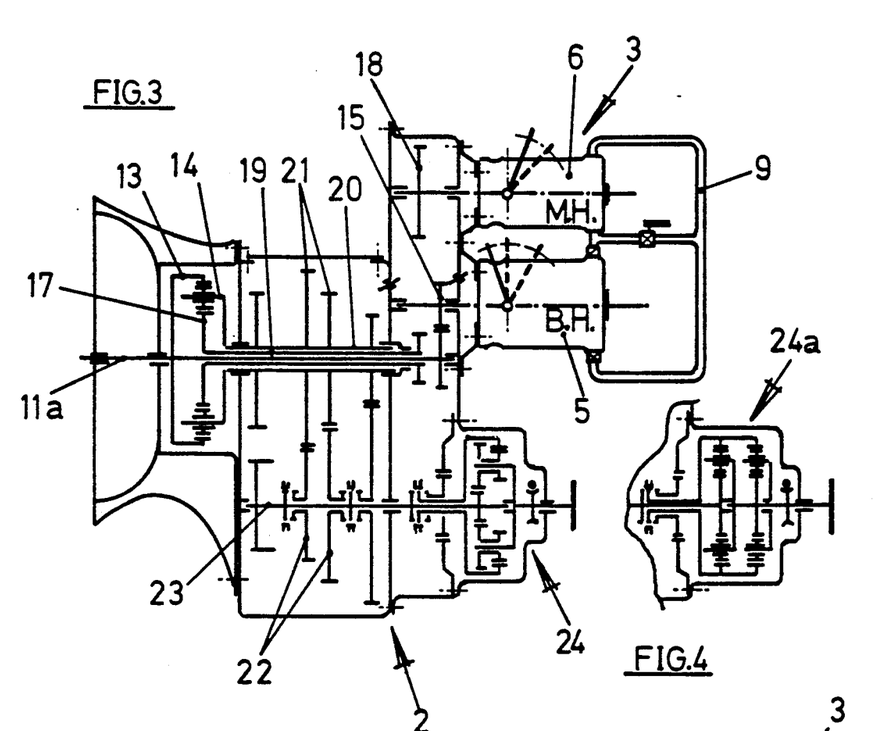
FIG. 3 is a sectional view as in FIG. 1, showing a 3×2 version which includes a planetary gear at the output shaft to allow for reduced and standard velocities.
FIG. 4 is close up view of a modified planetary gear of the output shaft shown in FIG. 3, which allows to obtain reduced and standard rates of speed

FIG. 3 shows a continuous gear box for a 3×2 version with a hydraulic transmission equipment, identical to that as described in FIG. 1. In this case, the input shaft consists of three separate, coaxial portions an internal portion (11a) which forms a solid part of the ring gear (13) of the epicycloidal gear and activates the pump (5) of the hydraulic transmission; an intermediate track (19) which is an integral part of the planetary plate holder (14) and has cogged wheels which interlock with the wheels and/or pinions (22) of the output shaft (23). In this case, the hydraulic pump is activated by the input shaft, i.e. by the thermal engine of the vehicle.

The hydraulic motor is repsonsable for the turning of the sun gear of the planetary gear. The planetary gear (24), installed at the back of the output shaft (23), acts in such a way that it allows to obtain reduced and normal speed rates. A possible alternative (24a) is shown in FIG. 4, this also allowes to obtain reduced and normal speeds. As before, the hydraulic transmission of the hydraulic motor is shown rotated for better graphic comprehension.

In FIGS. 1 and 3 and subsequent diagrams, the constitution and operational characteristics of the device (2) which is applied to conventional gear boxes, is not described.

Figure 5:
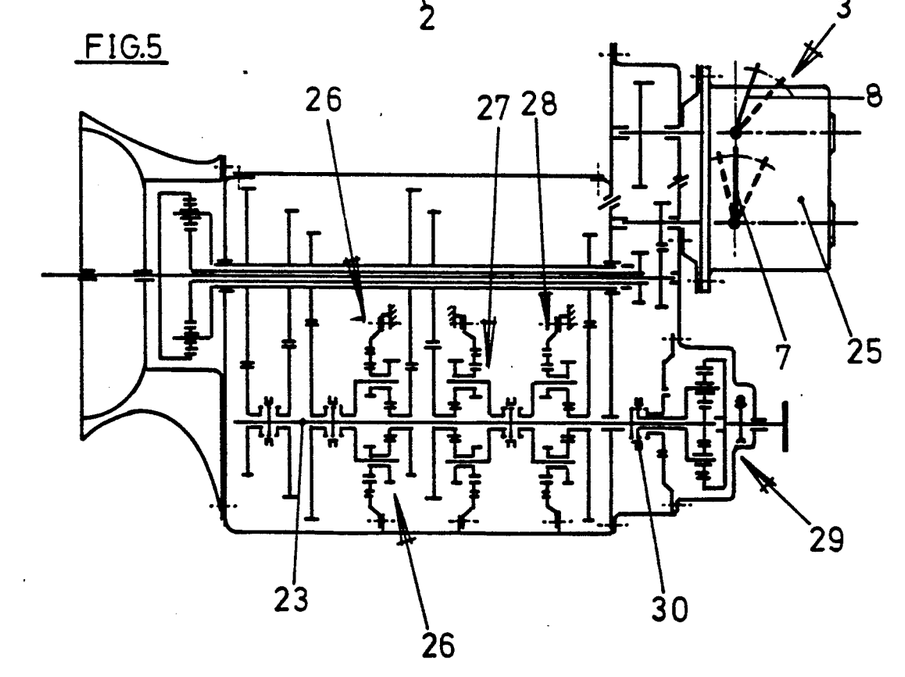
FIG. 5 is a sectional view similar to FIG. 3, showing continuous gear change mechanism with six transmission ratios.

FIG. 5 shows a continuous gear change mechanism with six transmission ratios. The hydrostatic transmission (3), together with the hydraulic pump and motor are contained within the same box (25). There are three planetary gears (26, 27 and 28) located along the output shaft (23), which obtain the highest transmission ratios corresponding to low gears. The planetary gear (29) situated at the outlet of the shaft (23) performs the function of a reverse gear by the action of the appropriate sliding lever (30). All other details on FIG. 5 are the same as those shown in FIG. 3.

Figure 6:
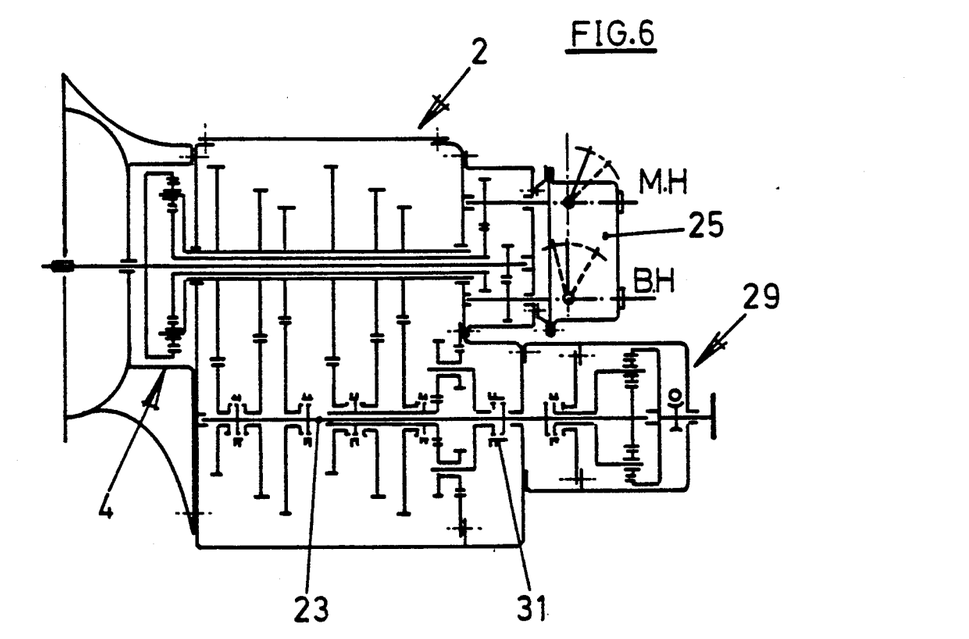
FIG. 6 is a skeleton section of a streamlined version of the mechanism shown in FIG. 5.
Figure 7:
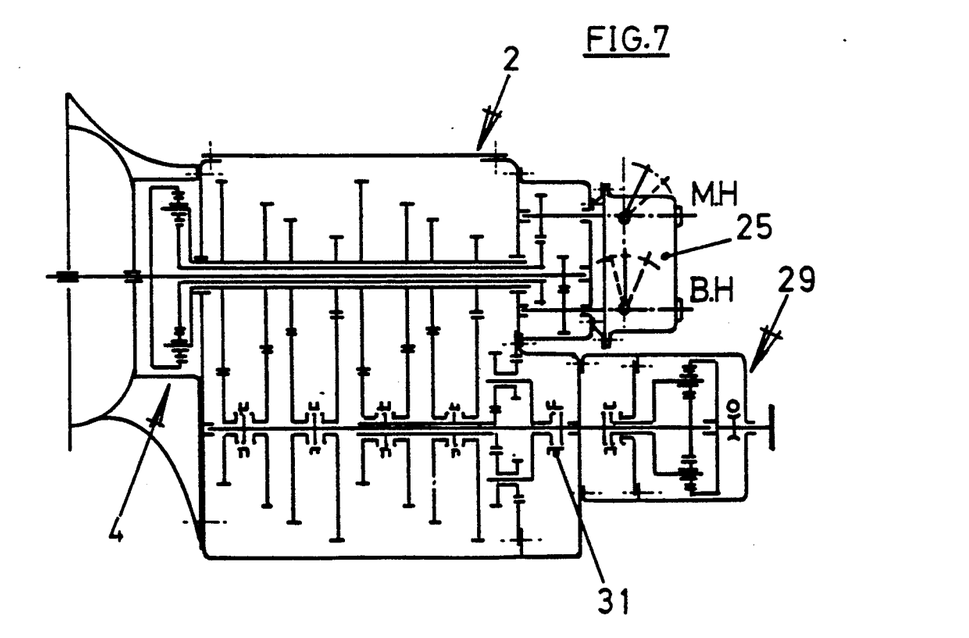
FIG. 7 is a simplified diametric section of an eight speed divide, similar to FIG. 6.

FIG. 6 is a simplified version of FIG. 5, in which an additional sliding lever (31) has been included to avoid the very high rates of spinning that would arise in the sun gear of the planetary gear mounted on the output shaft (23) whenever high gears were selected. The example of application shown in FIG. 7 is that of an eight-gear version and is similar to that shown in FIG. 6, remaining the input shaft, its coaxial portions interacting the epicycloidal gear and the connections with the pump and the engine as described in FIG. 3.

Figure 8:
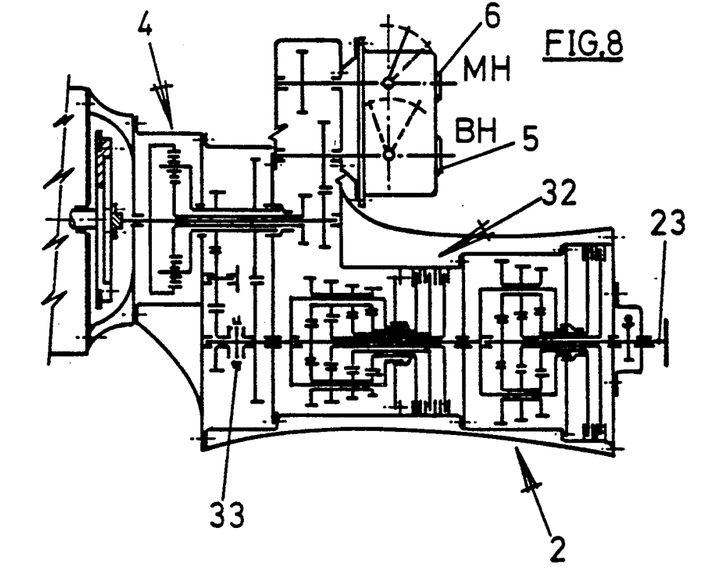
FIG. 8 is a skeleton section of a 3×2 version with planetary gears but no crowns.

FIG. 8 is a skeleton view of a 3×2 version with planetary gears but no crown gears at the output shaft (23) therefore including the appropriate disk brakes (32) for gear selection. This gearbox can be easily converted to automatic mode so the hydraulic motor (6) will be then of a fixed flow (variable cylinder capacity is necessary for a hydraulic motor only when the clutch facility is incorporated within the hydrostatic transmission; and this is not the case as we can see in FIG. 8 where the mentioned disk brakes (32) make the clutch device unnecessary.

Reverse gear is obtained with a sliding lever (33) which is located at the front of the output shaft (23).

Figure 9:
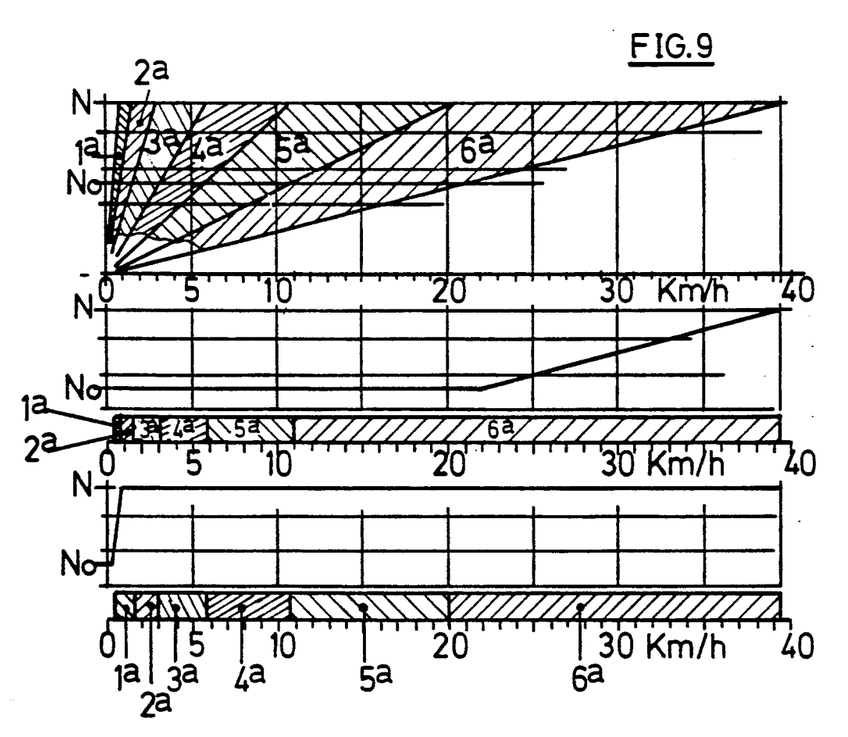
FIG. 9 shows, graphically, the kinematics of the continuous gear change mechanism when installed in a vehicle.

The graph in FIG. 9 pictures the kinematics of this continuous gear change mechanism described in this invention. Central and lower parts of this graph show the speed range intervals in the case of minimum fuel consumption and maximum output power respectively while the values of FIG. 2 are depicted in Y and X-coodinates.

All foregoing examples were aimed to de applied to low-speed vehicles such as farm tractors, public works machinery, etc. However the use of this invention is not restricted to only this field at all, once certain modifications are made.

It is understood that once the hydraulic pump has been activated by some component of the planetary gear which is connected to the thermal engine of the vehicle, as it has been said, there is an option to connect the pump directly to it via the appropriate mechanism.

In variable cylinder capacity option, the hydraulic motor lever can be connected to a standard clutch pedal so that the hydrostatic transmission can act as a conventional clutch facility; or on the othe hand levers attached to conventional accelerator and clutch pedals can act together varying the capacity of the pump and the hydraulic motor.

In FIGS. 10 through 21 several operational possibilities are shown related to the hydrostatic continuous and power-deriving module. All figures show the same reference numbers to illustrate equal components which appear more than one occasion.

Figure 10:
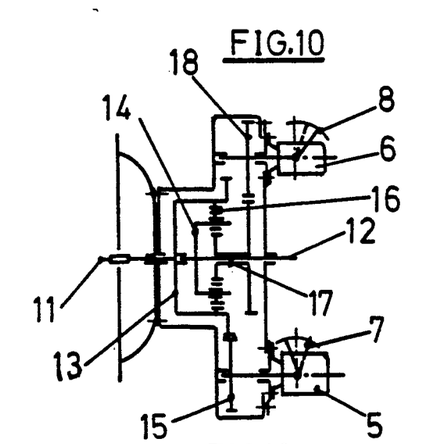
FIGS. 10 to 21 show various possibilities with respect to the continuity and power providing hydraulic module.

In FIG. 10 the propelling part of the input shaft is an integral part with the crown (13) of the epicycloidal gear while the propelled part (12) is an integral part with the planetary member holder (14) of this gear. Ring gear (13) includes two gears, one interlocks with a cogged wheel (15) which is an integral part of the pump shaft and the other interlocks with the planetary gears (16).

The sun gear (17) also has two cogged wheels, one which interlocks with a wheel (18) which is an integral part with the hydraulic motor shaft and another which interlocks with the planetary members (16).

Figure 11:
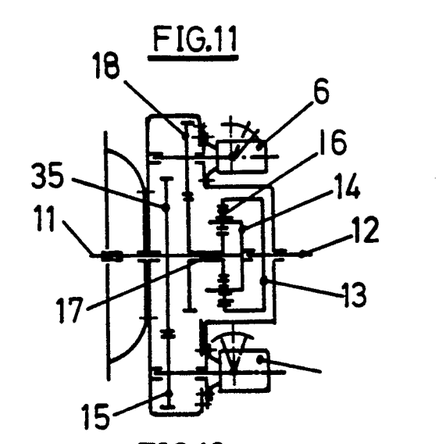

In FIG. 11 the propelling part (11) of the input shaft is an integral part of the planetary members holder (14) and the propelled part is an integral part of the crown gear (13). The propelling part of the input shaft (11) has a cogged wheel (35) which is part of the pump shaft. The sun gear (17) has two gears, one interlocks with the cogged wheel (18) which is solid with the hydraulic motor shaft and the other interlocks with the planetary members.

Figure 12:
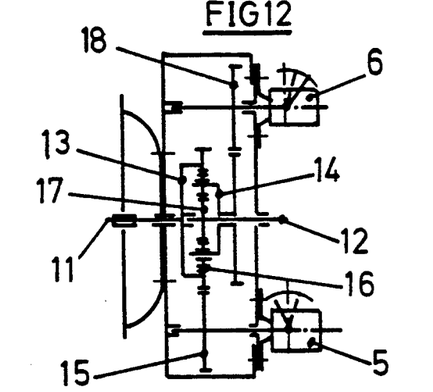

In the case of FIG. 12, the propelling part (11) of the input shaft is an integral part of the ring gear (13) of the epicycloidal gear and the propelled part (12) is an integral part of the sun gear (17). The ring gear (13) includes two gears one interlocks with a cogged wheel (15) which is a solid part with the hydraulic pump shaft and the other interlocks with the planetary members (16). The planetary members holder (14) has a gear which interlocks with the cogged wheel (18) which is a part of the hydraulic motor shaft.

Figure 13:
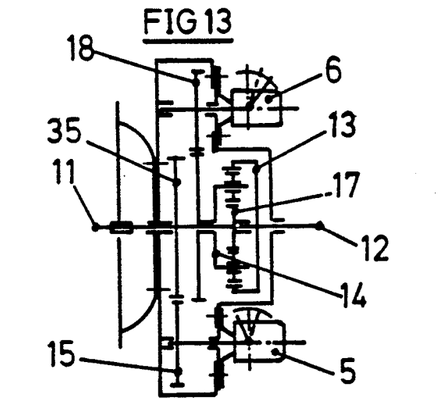

In the case of FIG. 13, the propelling portion (11) of the input shaft is an integral part of the sun gear (17) of the epicycloidal gear and the propelled part (12) is an integral part of the ring gear (13). The propelling part (11) of the input shaft holds a cogged wheel (35) which interlocks with the hydraulic pump shaft. The planetary members holder (14) has a cogged wheel which interlocks with a gear (18) which is part of the hydraulic motor.

Figure 14:
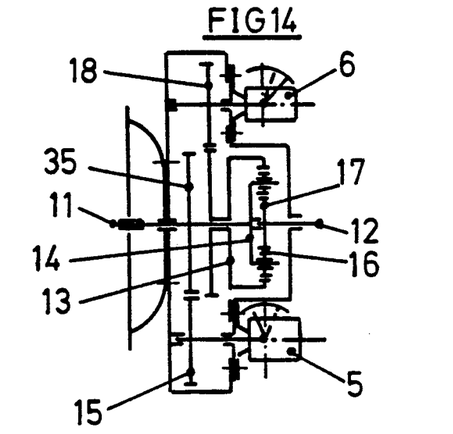

In the case of FIG. 14, the propelling portion (11) of the input shaft is an integral part of the planetary members holder (14) of the epicycloidal gear and the propelled portion (12) is an integral part of the sun gear (17). The propelling portion (11) includes a cogged wheel (35) which interlocks with the cogged wheel (15) which is an integral part of the pump shaft. The ring gear (13) of the epicycloidal gear has two cogged wheels, one which interlocks with the cogged wheel (18) which is part of the hydraulic motor shaft and another which interlocks with the planetary members (16).

Figure 15:
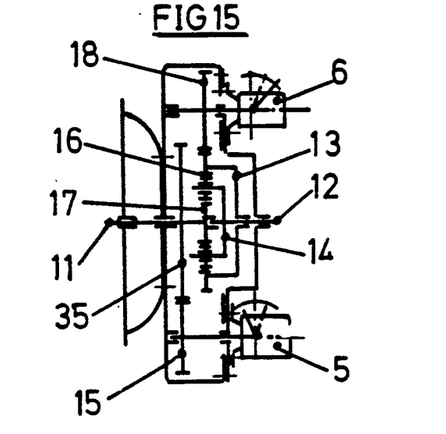

In FIG. 15, the propelling portion of the input shaft (11) is an integral part of the sun gear (17) and the propelled portion (12) is an integral part of the planetary members holder (14) of the epicycloidal gear. The propelling portion (11) has a cogged wheel (35) which interlocks with the cogged wheel (15) which is an integral part of the hydraulic pump shaft. The ring gear (13) has two cogged wheels, one interlocks with the cogged wheel (18) which is an integral part of the hydraulic motor and another which interlocks with the planetary members (16).

Figure 16:
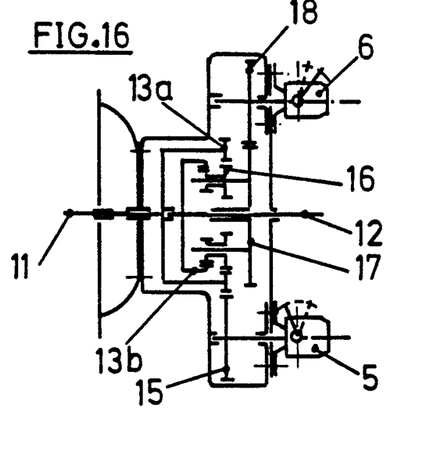

In FIG. 16, the propelling portion (11) of the input shaft is an integral part of the first ring gear (13a) of the epicycloidal gear, and the propelled portion (12) is an integral part of a second crown gear (13b) of the same gear. The ring gear (13a) has two gears one which interlocks with the cogged wheel (15) which is an integral part of the pump shaft and another which interlocks with the double planetary members (16). The planetary members holder (17) has a cogged wheel which interlocks with a wheel (18) which is part of the hydraulic motor shaft.

Figure 17:
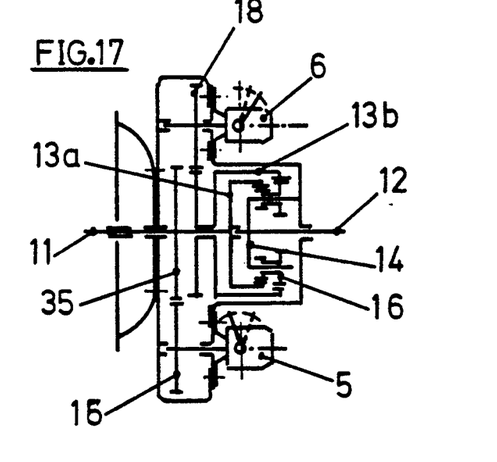

In FIG. 17, the propelling portion of the input shaft is an integral part of ring gear (13a) of the epicycloidal gear and the propelled portion (12) is an integral part of the planetary members holder (14). The input portion has a cogged wheel (35) which interlocks with the cogged wheel (15) which is an integral part of the pump shaft. The epicycloidal gear includes alsoa second ring gear (13b) which has two cogged wheels; one of which interlocks with the cogged wheel (18) which is an integral part of the hydraulic motor shaft and another which interlocks with the double planetary members (16) as was the case of the previous figure.

Figure 18:
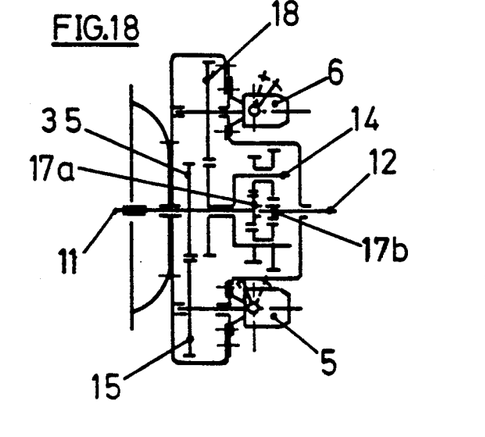

In FIG. 18, the propelling portion of the input shaft (11) is an integral part of a first sun gear (17a), while the propelled portion is an integral part of a second sun gear (17b). The propelling portion has a cogged wheel (35) which interlocks with the cogged wheel (15) of the pump shaft. The planetary members holder (14) has a cogged wheel which is in gear with the wheel (18) which is an integral part of the hydraulic motor shaft.

Figure 19:
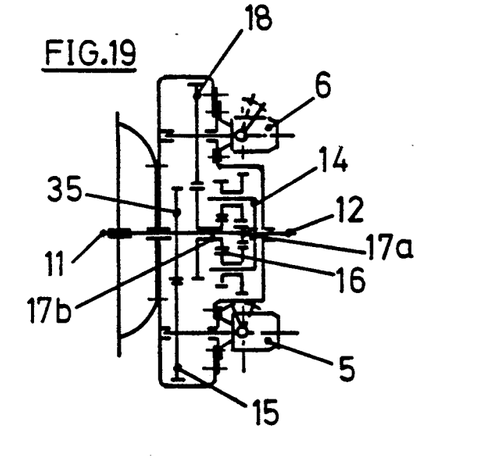

In FIG. 19, the propelling portion of the input shaft (11) is an integral part of a first sun gear (17a) of the epicycloidal gear and the propelled part (12) is an integral part of the planetary members holder (14). The propelling portion (11) has a cogged wheel (35) which interlocks with the cogged wheel (15) which is an integral part of the pump (5) shaft. There is also a second sun gear (17b) which has two cogged wheels, one which is in gear with the cogged wheel (18) which is an integral part of the hydraulic motor (6) shaft, and another which interlocks with the planetary members (16).

Figure 20:
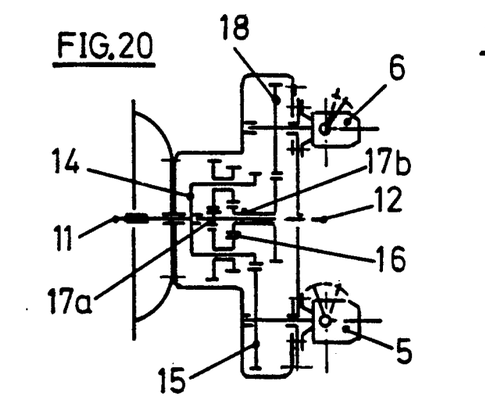

In FIG. 20, the propelling portion (11) of the input shaft is an integral part of the planetary members holder (14) of the epicycloidal gear while the propelled part of it (13) is an integral part of a first sun gear (17a). The planetary members holder (14) includes a cogged wheel which interlocks with the wheel (15) which is an integral part of the hydraulic pump (5). The second sun gear (17b) has two cogged wheels, one of them is in gear with the double planetary members holder (16) and the other interlocks with a cogged wheel (18) which is a part of the hydraulic motor.

Figure 21:
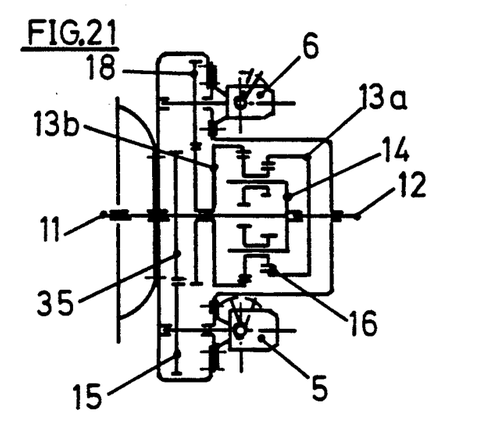

Finally, in FIG. 21, the input shaft portion (11) is an integral part of the planetary members holder (14) of the epicycloidal gear and the propelled portion (12) is an integral part of a crown gear (13a). The propelling portion (11) has a wheel (35) which interlocks with the cogged wheel (15) which is part of the pump shaft.

There is a second crown gear (13b) which has two cogged wheels one interlocking with the cogged wheel (18) which is a part of the engine (6) shaft and another which interlocks with the double planetary members (16).

The main basic characteristic of the examples shown in FIGS. 10 through 21 is that they all adhere to the same formula which interconnects the following magnitudes:

C = Operational scope (ratio between maximum and minimum output speed, for a fixed input shaft spinning speed).

R = Performance of the continuous gear-box which incorporates some of the modules shown in the figures.

D = Deviation of power, or power derived through the hydrostatic transmission which arises from power produced by the thermal engine of the vehicle.

Rh = Performance of the hydrostatic transmission (current motor and hydraulic pump equipment reach performance rates of 80% approximately).

Figure 22:
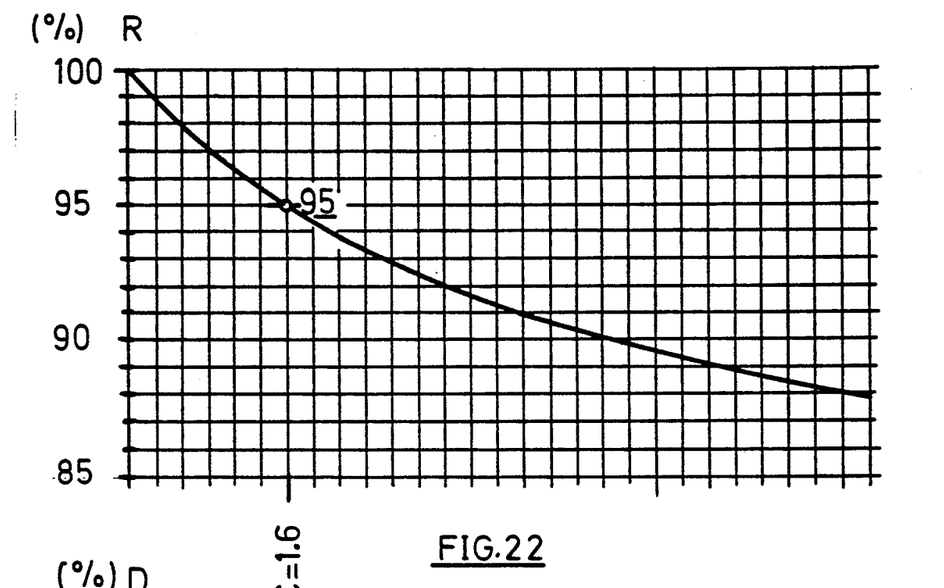
FIG. 22 is a diagram showing the performance values of the gear box described in this invention.

FIG. 22 shows performance values (R) in percentage terms with respect to operational scope (C).

Figure 23:
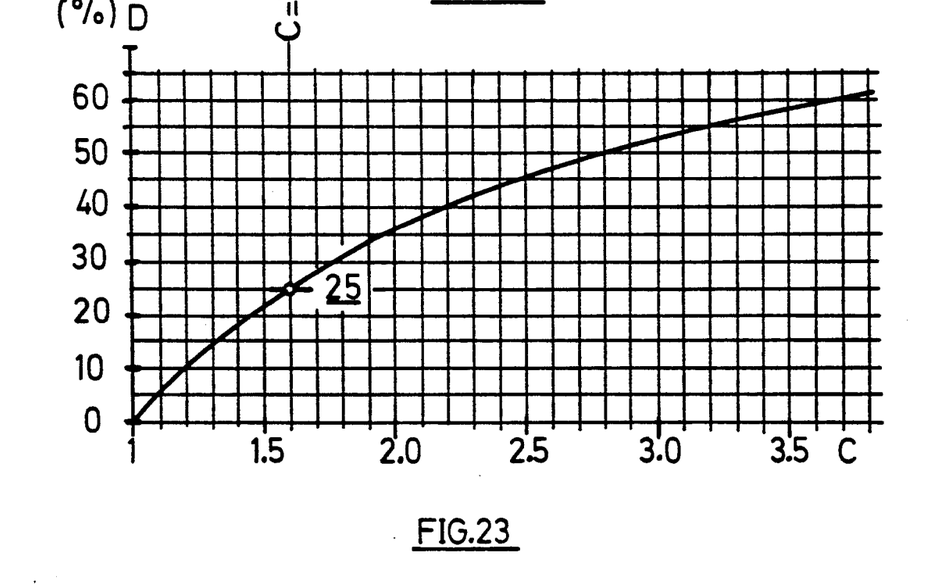
FIG. 23 is a diagram showing, in percentage terms, the deviation of power corresponding to each value of the operational range. The deviation corresponds to the maximum value.

FIG. 23 shows the percentage values of D corresponding to each operational scope value C). In the case of both graphs, the values corresponding to 95% and 25% or R and D respectively have been marked fod C=1.6.

Figure 24:
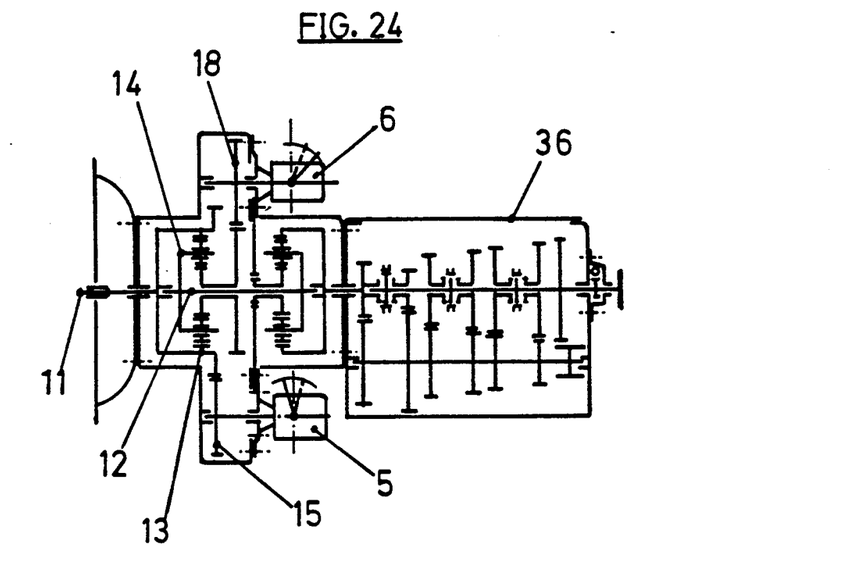
FIG. 24 is a skeleton section of a gear box using the module shown in FIG. 10.

FIG. 24 shows a continuous gear-box which can be achieved by incorporating a module as shown in FIG. 10 to a standard gear-box (36) with six transmission ratios. The same reference numbers as were used in FIG. 10 are used in this one.

Figure 25:
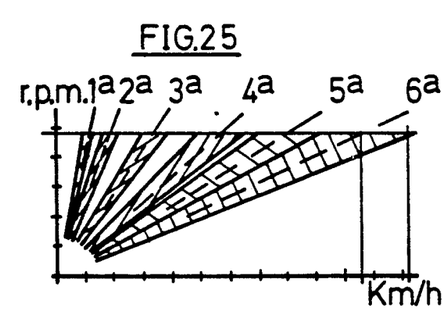
FIGS. 25 to 28 show the kinematics relating to different versions of the gear change mechanism.

FIG. 25 shows the kinematics of a continuous gear-box as shown in FIG. 24, using a conventional gear-box of six transmission ratios and non uniform intervals, the lowest ratio corresponds to the fifth to sixth gear change jump.

Figure 26:
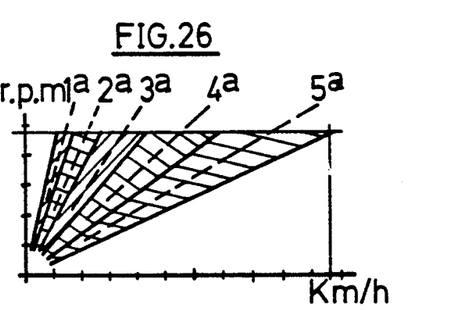
Figure 27:
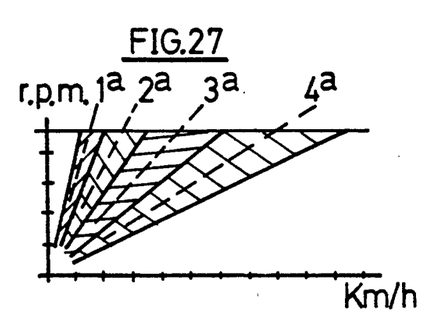
Figure 28:
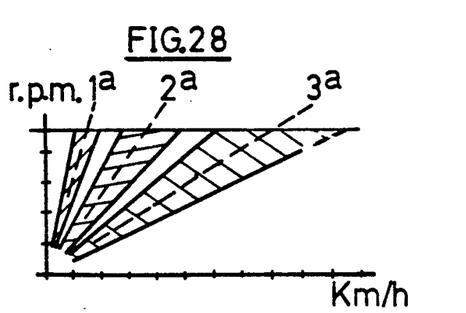

FIGS. 26, 27 and 28 show in graph form how to obtain the same speed scope as in the case of a conventional gear-box with of six gears by using conventional gear boxes of 5, 4 and 3 gears respectively; the first gear-second gear change in FIG. 28, these discontinuities or "jumps" are of noticeably lower levels compared to the ratio of turning rates of the thermal engine of a vehicle on maximum power and maximum torque.

Figure 29:
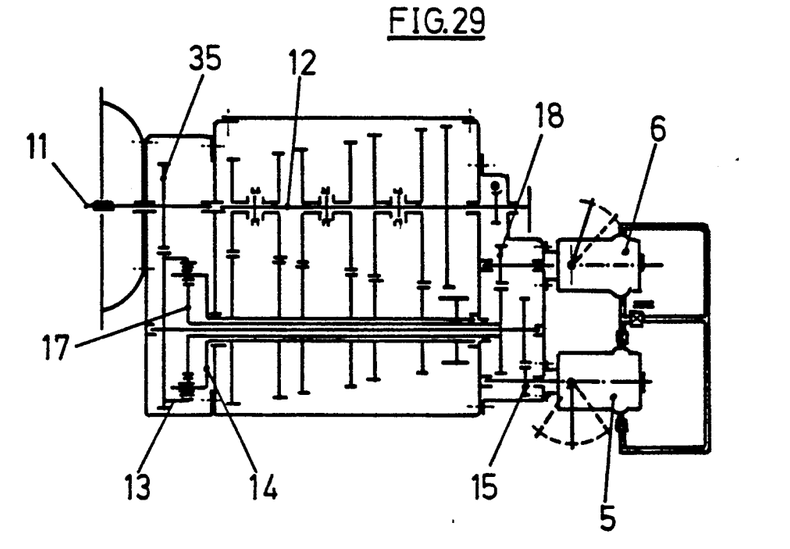
FIGS. 29 and 30 are diametric sections of two possible new versions based on this continuous gear box invented.

FIG. 29 shows the integration of the hydrostatic module for power deriving and continuous facilities in order to obtain a continuous gear-box with very high performance levels and six gear ranges, which can be used for industrial vehicles.

Figure 30:
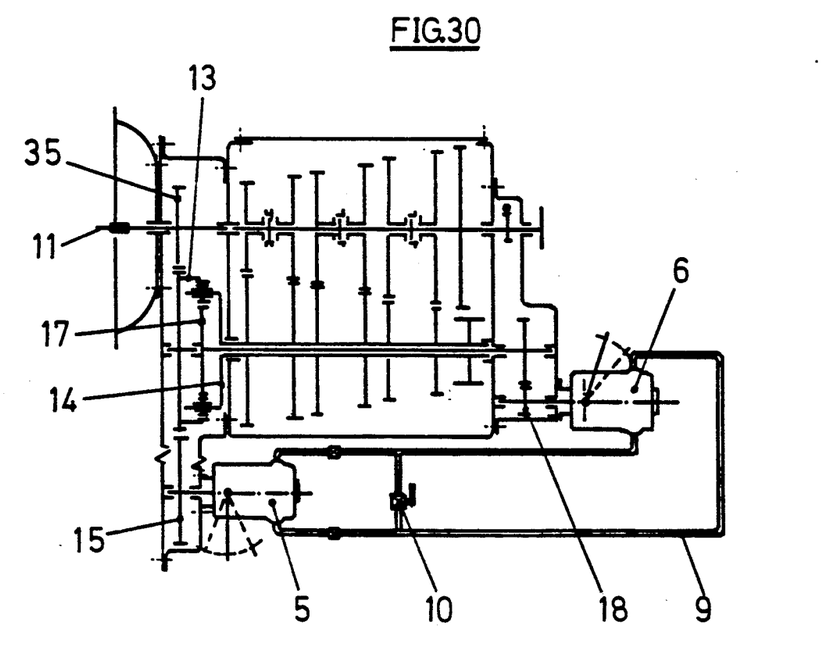

FIG. 30 is a skeleton view of the integration of this mentioned module in a six gear range gear-box which can be used for similar purposes as the former figure.

Figure 31:
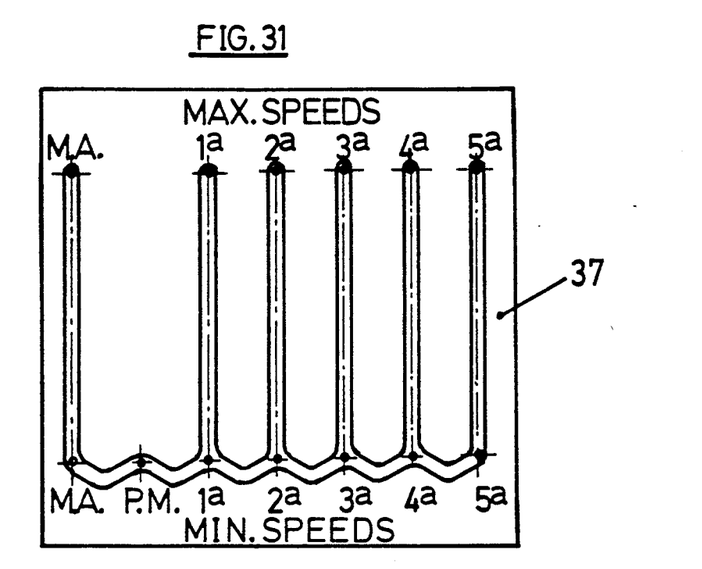
FIGS. 31 and 32 show two plate versions for the manual speed range selection stick.
Figure 32:
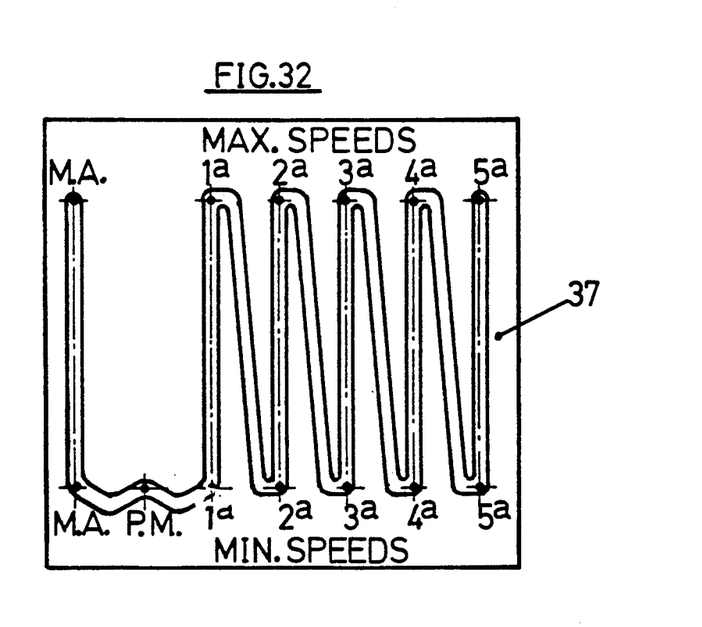

At last, FIGS. 31 and 32 correspond to two versions for plates (37) for the manual speed range selection lever, being higher gears situated at the upper part and lower speed gears at the bottom.

I claim:

1. A continuous gear change mechanism comprising:
an input shaft,
an output shaft,
gear means further comprising a hydrostatic transmission having a pump and a hydraulic motor, and an epycicloial gear;
wherein said hydrostatic transmission pump is variable flow, has a reversible flow operation, and has a null flow position;
wherein said epicycloidal gear includes a ring gear, a sun gear, planetary members and a planetary member holder, in which at least two gear components connect with independent aligned portions of the input shaft and at least one of the components of the hydraulic motor is linked to one component of the epicycloidal gear; and
wherein said input shaft has two independent coaxially aligned portions; a propelling portion, which is suitable for connection to an output shaft of a thermal engine of a vehicle, which forms an integral part of one of the epicycloidal gear components, and a propelled portion, which is locked to another epicycloidal gear component:
wherein the propelling portion of the input shaft is attached to the sun gear of the epicycloidal gear and has a first cogged wheel which connects with a second cogged wheel attached to the hydraulic pump shaft;
wherein the propelled portion is attached to the ring gear of the epicycloidal gear; and connects with double planetary members; and
wherein the planetary member holder includes a cogged wheel which connects with a cogged wheel attached to the hydraulic motor.

2. A continuous gear change mechanism comprising:
an input shaft,
an output shaft,
gear means further comprising a hydrostatic transmission having a pump and a hydraulic motor, and an epicycloidal gear:
wherein said hydrostatic transmission pump is variable flow, has a reversible flow operation, and has a null flow position;
wherein said epicycloidal gear includes a ring gear, a sun gear, planetary members and a planetary member holder, in which at least two gear components connect with independent aligned portions of the input shaft and at least one of the components of the hydraulic motor is linked to one component of the epicycloidal gear; and
wherein said input shaft has two independent coaxially aligned portions; a propelling portion, which is suitable for connection to an output shaft of a thermal engine of a vehicle, which forms an integral part of one of the epicycloidal gear components, and a propelled portion, which is locked to another epicycloidal gear component:
wherein the propelling portion of the input shaft is attached to a first ring gear of the epicycloidal gear;
wherein the propelled portion is attached to a second ring gear;
wherein the first ring gear includes at least two gears, one connecting with a cogged wheel attached to the pump shaft and a second which connects with double planetary members; and
wherein the planetary members holder includes a cogged wheel which connects with a cogged wheel attached to the hydraulic motor shaft.

3. A continuous gear change mechanism comprising:
an input shaft,
an output shaft,
gear means further comprising a hydrostatic transmission having a pump and a hydraulic motor, and an epicycloidal gear:
wherein said hydrostatic transmission pump is variable flow, has a reversible flow operation, and has a null flow position;
wherein said epicycloidal gear includes a ring gear, a sun gear, planetary members and a planetary member holder, in which at least two gear components connect with independent aligned portions of the input shaft and at least one of the components of the hydraulic motor is linked to one component of the epicycloidal gear; and
wherein said input shaft has two independent coaxially aligned portions: a propelling portion, which is suitable for connection to an output shaft of a thermal engine of a vehicle, which forms an integral part of one of the epicycloidal gear components, and a propelled portion, which is locked to another epicycloidal gear component:
wherein the propelling portion of the input shaft is attached to a first sun gear of the epicycloidal gear and includes a first cogged wheel which connects with a second cogged wheel attached to the pump shaft;
wherein the propelled portion is attached to a second sun gear; and
wherein the planetary members holder has a cogged wheel which connects with a cogged wheel attached to the hydraulic motor shaft.

4. A continuous gear change mechanism comprising:
an input shaft,
an output shaft,
gear means further comprising a hydrostatic transmission having a pump and a hydraulic motor, and an epicycloidal gear;
wherein said hydrostatic transmission pump is variable flow, has a reversible flow operation, and has a null flow position;

wherein said epicycloidal gear includes a ring gear, a sun gear, planetary members and a planetary member holder, in which at least two gear components connect with independent aligned portions of the input shaft and at least one of the components of the hydraulic motor is linked to one component of the epicycloidal gear; and wherein said input shaft has two independent coaxially aligned portions; a propelling portion, which is suitable for connection to an output shaft of a thermal engine of a vehicle, which forms an integral part of one of the epicycloidal gear components, and a propelled portion, which is locked to another epicycloidal gear component:

wherein the propelling portion of the input shaft is attached to a first sun gear of the epicycloidal gear and includes a first cogged wheel which connects with a second cogged wheel attached to the pump shaft;

wherein the propelled portion is attached to the planetary members holder; and wherein a second sun gear includes two cogged wheels, one connecting with a cogged wheel attached to the hydraulic motor shaft and a second which connects with the planetary members holder.

5. A continuous gear change mechanism comprising:
an input shaft,
an output shaft,
gear means further comprising a hydrostatic transmission having a pump and a hydraulic motor, and an epicycloidal gear:

wherein said hydrostatic transmission pump is variable flow, has a reversible flow operation, and has a null flow position:

wherein said epicycloidal gear includes a ring gear, a sun gear, planetary members and a planetary member holder, in which at least two gear components connect with independent aligned portions of the input shaft and at least one of the components of the hydraulic motor is linked to one component of the epicycloidal gear; and wherein said input shaft has two independent coaxially aligned portions; a propelling portion, which is suitable for connection to an output shaft of a thermal engine of a vehicle, which forms an integral part of one of the epicycloidal gear components, and a propelled portion, which is locked to another epicycloidal gear component:

wherein the propelling portion of the input shaft is attached to the planetary members holder of the epicycloidal gear and includes a cogged wheel which connecting with a cogged wheel attached to the hydraulic pump shaft;

wherein the propelled portion is attached to the sun gear; and wherein a second sun gear has two cogged wheels, one connecting with double planetary members and the second which connects with a cogged wheel which is attached to the hydraulic motor shaft.

6. A continuous gear change mechanism comprising:
an input shaft,
an output shaft,
gear means further comprising a hydrostatic transmission having a pump and a hydraulic motor, and an epicycloidal gear:

wherein said hydrostatic transmission pump is variable flow, has a reversible flow operation, and has a null flow position;

wherein said epicycloidal gear includes a ring gear, a sun gear, planetary members and a planetary member holder, in which at least two gear components connect with independent aligned portions of the input shaft and at least one of the components of the hydraulic motor is linked to one component of the epicycloidal gear; and wherein said input shaft has two independent coaxially aligned portions: a propelling portion, which is suitable for connection to an output shaft of a thermal engine of a vehicle, which forms an integral part of one of the epicycloidal gear components, and a propelled portion, which is locked to another epicycloidal gear component:

wherein the propelling portion of the input shaft is attached to the planetary members holder of the epicycloidal gear and has a first cogged wheel which connects with a second cogged wheel attached to the pump shaft;

wherein the propelled portion is attached to a first ring gear; and wherein a second ring gear has two cogged wheels, one connecting with a cogged wheel attached to the motor shaft and the second connecting with the planetary members.

7. A continuous gear change mechanism comprising:
an input shaft,
an output shaft,
gear means further comprising a hydrostatic transmission having a pump and a hydraulic motor, and an epicycloidal gear:

wherein said hydrostatic transmission pump is variable flow, has a reversible flow operation, and has a null flow position:

wherein said epicycloidal gear includes a ring gear, a sun gear, planetary members and a planetary member holder, in which at least two gear components connect with independent aligned portions of the input shaft and at least one of the components of the hydraulic motor is linked to one component of the epicycloidal gear;

wherein the propelling portion of the input shaft includes three independent coaxial portions;

wherein an interior portion of said input shaft is attached to the ring gear of the epicycloidal gear and is capable of activating the hydraulic transmission pump;

wherein an intermediate portion of said input shaft is attached to the sun gear of the epicycloidal gear and is propelled by the hydraulic motor; and wherein an exterior portion of said input shaft is attached to a planetary members holder plate and includes a cogged wheel which connects with cogged wheels of the output shaft.

8. The gear change mechanism according to claim 7, wherein the output shaft further comprises a planetary gear on one end to provide for reverse gear.

9. The gear change mechanism according to claim 7, wherein the output shaft further comprises at least two planetary gears for speed reduction.

10. The gear change mechanism according to claim 7, wherein the output shaft further comprises a planetary gear with a sliding lever positioned between the output shaft and the planetary members holder of said planetary gear.

11. A gear change mechanism according to claim 7, wherein the planetary gears attached to the output shaft do not have crown gears, and
wherein the sun gear includes a disk brake for gear selection and the output shaft includes a planetary gear with a sliding lever which allows for reverse gear operation.

* * * * *